Dec. 17, 1968   O. BSCHORR ET AL   3,416,628
SHOCK WAVE GENERATOR
Filed Feb. 21, 1967
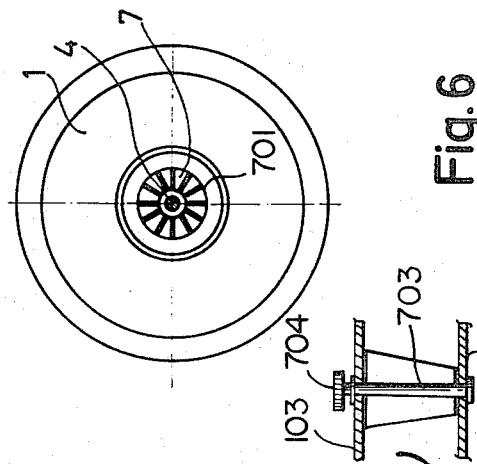
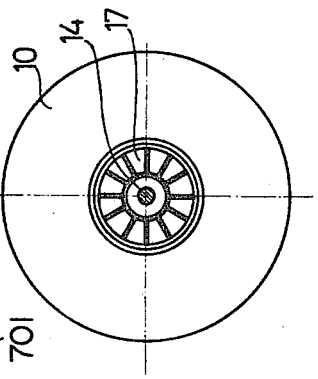
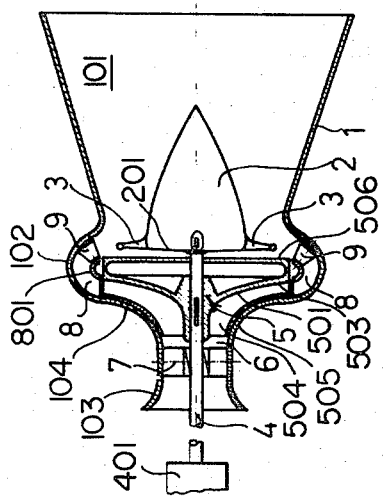
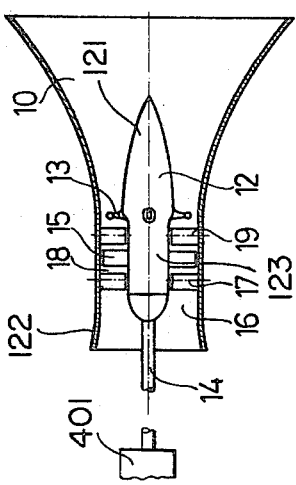
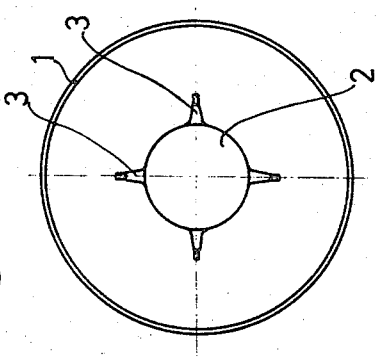
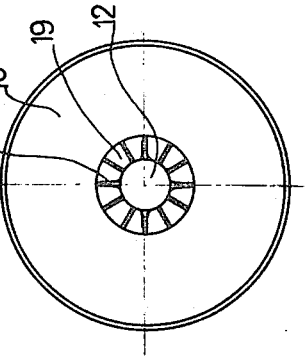
*INVENTORS*
OSKAR BSCHORR
JOSEF F. NEUMAIR
BY
*Robillard + Byrne*
ATTORNEYS United States Patent Office 3,416,628
Patented Dec. 17, 1968

3,416,628
SHOCK WAVE GENERATOR
Oskar Bschorr and Josef F. Neumair, Munich, Germany, assignors to Entwicklungsring Sud G.m.b.H., a corporation of Germany
Filed Feb. 21, 1967, Ser. No. 617,664
Claims priority, application Germany, Feb. 25, 1966, E 31,117
5 Claims. (Cl. 181—.5)

ABSTRACT OF THE DISCLOSURE

A shock wave generator including a casing having a forward section and a rearward intake section, a rotor in the forward section having a radial arm or blade extending from the base periphery of the rotor, a compressor positioned rearwardly of the rotor, the compressor and casing being so configured to define an air duct leading from air intake casing section to discharge the air against the rotor arms, and adjustable vanes for guiding and modulating the air positioned rearward of the compressor, and a second set forward of the compressor.

---

The invention refers to a shock wave generator for the generation of random noise used in the simulation of jet noise.

The hitherto known shock wave generators were provided with a rotating arm having a circumferential speed exceeding the speed of sound. Such systems have good acoustic efficiency, but produces only a line spectra, which are difficult to vary, and a random spectra cannot be generated. Furthermore, it is the sound intensity which cannot be varied independently of the frequency, since both values are influenced only by the circumferential speed. These are the main reasons why the hitherto known shock wave generators are not suitable for simulation of jet noise.

The invention aims at efficiently eliminating the described short-comings. This is achieved by arranging air ducts and adjustable vanes in a generator case in such a manner, that a rotor blade or arm is hit by air flowing from opposite direction to the rotor.

The arrangement ensures that the relative speed of the rotor rises in comparison to the speed of the ambiant medium, thus causing the sound intensity to rise. The increase of the relative speed above the speed of sound generates compression shocks, which have a highly intense and powerful sound radiation, which are used, for example, in sonic resistance tests.

Another advantage of the generator herein is that the size of the rotor blade or arm, and thus of the whole equipment, can be considerably reduced due to the increased relative speed.

A particular advantage is the adjustability of air direction vanes which are so positioned that the compressor output characteristics may be regulated in the known manner.

For the modulation of the air current, the vanes may be adjustable, thus allowing the air current to be modulated by using timing programmes which may be selected at random; and, not only periodical, but a periodical phenomena can be simulated.

The invention is cited and drawn by examples. The figures show:

FIGURE 1 is a partial longitudinal section of a radial type shock wave generator embodying the invention herein;

FIGURE 2 is a view of the generator, as in FIGURE 1, as seen from the rotor end;

FIGURE 3 is a view of the generator, as in FIGURE 1, as seen from the drive end;

FIGURE 3a is a view illustrating how the vanes may be adjustably mounted;

FIGURE 4 is a partial longitudinal section of an axial type shock wave generator;

FIGURE 5 is a view of the generator, as in FIGURE 4, as seen from the rotor side; and FIGURE 6 is a view of the generator, as in FIGURE 4, as seen from the drive end.

Referring to the drawings, the shock wave generator disclosed in FIGURES 1 to 3, includes a casing 1, having a forward frusto conical section 101, a center annular section 102 which defines an inwardly facing U or semi-circular shaped member, the diameter at the center thereof being longer than the smallest inside diameter of the frusto conical forward section 101. The casing 1 further includes a cylindrically shaped intake throat or end section 103, which is joined to the annular center section 102 by a radial casing wall 104.

Positioned along the axial center of casing 1 is an axle or drive shaft 4, supported by suitable bearings (not shown), and driven by any suitable means such as a motor 401, spaced rearwardly from the air intake end of throat 103. Carried by the forward end of shaft 4 is a conical shaped rotor 2 positioned with its apex forward and with the center of its base 201 secured to the shaft 4. The rotor 2 is provided with one or more blades or arms 3 extending radially from the base periphery thereof, the rotor being so positioned that the blades 3 are adjacent the forward portion of the annular center section 102 for purposes hereinafter described.

Disposed rearwardly of the rotor 2 is a compressor 5 having a hub 501 secured to the shaft 4, the hub including a radial web 503 of substantially similar contour to the radial casing wall 104. The web 503 supports a forward disc portion 506 which parallels the base 201 of rotor 2, and approximates in diameter the diameter of the smaller end of the worward casing section 101. Extending rearwardly from the web 503 are a plurality of spaced compressor blades 504, the rear edges of which are connected by a closure web member 505 of like contour to the adjacent casing radial wall 104. It is thus seen that the compressor and associated parts are configured and spaced relative to the casing to define therewith an air flow channel or duct radially connecting the rearward air take-in end of the casing and discharging against the rotor blades or arms 3.

Disposed rearwardly of the compressor and within the throat or compressor room 6 are a plurality of guide vanes 7 extending radially from the outer casing wall to an inner supporting ring 701 (FIGURE 3). As best seen in FIGURE 3a, each vane 7 is an isosceles trapezoid carried by a center pin 703, pivotally mounted at its inner end on ring 701, and at its outer end on the casing wall of the rear section 103. The outer end of center pin 703 extends outside the casing and is provided with an end knob 704 for angularly adjusting the vane. Obviously, means may be added for simultaneous adjustment of all vanes.

Considering the description to this point it is seen that the air is drawn in the after end of the shock wave generator, flows past the vanes 7 which may be adjusted for modulating the air, then through the radial compressor duct wherein it is compressed, and then into the inwardly facing U-channel of the center section 102. The interior of the center section 102 has a duct 8 therein having an inner wall 801 to produce a reverse flow of the air into the path of the blades 3 carried by the rotor 2. The forward end of the duct 801 may have positioned therein a second set of guide and modulating vanes 9, similar to the vanes 7, and adjustably mounted in like manner thereto as shown in FIGURE 3a. Thus the air may again be modulated as it is discharged.

It is thus seen that upon rotation of the rotor 2, the rotor blade or blades 3 will be impinging upon by the stream of air directed there against from the rearward intake end of the generator, whereby the shock waves may be produced. Additionally, by adjustment of the vanes 7 and 9, modulation of the air may be accomplished as desired.

Referring now to the embodiment shown in FIGURES 4 to 6 it is somewhat simpler in construction than the first embodiment, in that the casing 10 has only a frustoconical forward section 210 and a cylindrical rearward section 16 extending from the smaller end of the forward section. Herein the shaft 14 has a single member 121 thereon, the forward end of which is a conical rotor 12 having one or more radial blades 13 adjacent the rotor base and positioned at approximately the joining point of the casing forward section 210 and rearward section 16.

Rearwardly of rotor 12 the member 121 has hub section 123 which is configured and spaced relative to the casing wall 122 to define an axial flow channel or duct 18, as distinguished from the configuration and spacing in the first embodiment which provides a radial flow channel or duct. The hub 123 carries a plurality of radially extending compressor blades 15, and as in the first embodiment, guide and modulating vanes 17 are positioned rearwardly of the compressor blades towards the air intake end, and a second set of guide and modulating vanes 19 are positioned forwardly of the compressor blades at the discharge end of the duct 18. The vanes 17 and 19 are mounted to be adjustable in like manner to blades 7 of FIGURE 1, as shown in FIGURE 3a.

Comparing the two embodiments it is seen that each generator has in sequence an air inlet, modulating vanes, a compressor, an air flow duct from the compressor to a second set of modulating vanes and a rotor having blades impinged by the air discharged from the air flow duct. Additionally, each embodiment has both the compressor and rotor mounted on the one rotating means, thus requiring a single power means.

The following is claimed:
1. An air wave shock generator of the type described including:
   (a) a casing open at both ends having a forward section and a rearward air intake section,
   (b) a rotor in the forward section having at least one radial blade extending from the periphery of the base of the rotor,
   (c) air compressor means in the rear section, the compressor means and casing being configured and positioned relative to one another to define an air flow duct from the rearward section and having a forward outlet discharging air against the rotor radial blade,
   (d) adjustable guide vane means pivotally mounted within the air duct for modulating the air, and
   (e) means for rotating the compressor and rotor.

2. The generator defined in claim 1 wherein the air flow duct extends radially from the rearward section.
3. The generator defined in claim 1 wherein the air flow duct extends axially from the rearward section.
4. An air wave shock generator of the type described including:
   (a) a casing open at both ends having a forward section and a rearward air intake section,
   (b) a rotor in the forward section having at least one radial blade extending from the periphery of the base of the rotor,
   (c) air compressor means in the rear section, the compressor means and casing being configured and positioned relative to one another to define an air flow duct from the rearward section and having a forward outlet discharging air against the rotor radial blade,
   (d) first adjustable guide vane means within the air duct between the air intake and the compressor for modulatnig the air,
   (e) second adjustable guide vane means within the air duct between the compressor and the forward section for modulating the air, and
   (f) means for rotating the compressor and rotor.
5. An air wave shock generator of the type described including:
   (a) a casing open at both ends having a forward section and a rearward air intake section,
   (b) a rotor in the forward section having at least one radial blade extending from the periphery of the base of the rotor,
   (c) air compressor means in the rear section, the compressor means and casing being configured and positioned relative to one another to define an air flow duct from the rearward section and having a forward outlet discharging air against the rotor radial blade,
   (d) adjustable guide vane means within the air duct for modulating the air, said adjustable guide vane means being connected to said casing for pivotal movement about an axis which is substantially radial with respect to the casing, and
   (e) means for rotating the compressor and rotor.

References Cited
UNITED STATES PATENTS

| | | | |
|---|---|---|---|
| 2,570,081 | 10/1951 | Szczeniowski | 116—137 |
| 2,664,850 | 1/1954 | Smith | 116—137 |
| 3,096,080 | 7/1963 | Willems | 116—137 X |
| 3,110,153 | 11/1963 | House | 60—35.6 |
| 3,148,504 | 9/1964 | Keen | 60—35.6 |

BENJAMIN A. BORCHELT, *Primary Examiner.*

G. H. GLANZMAN, *Assistant Examiner.*

U.S. Cl. X.R.

116—137, 147